Figure 2:
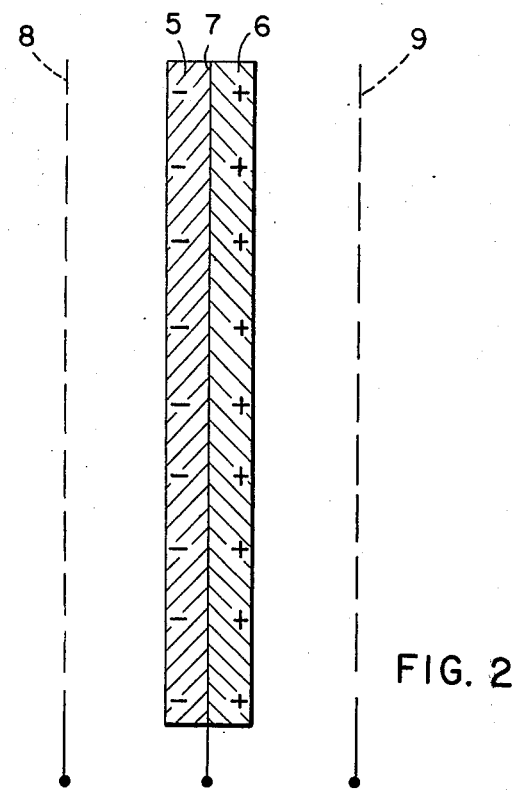

United States Patent [19]

Van Turnhout

[11] B 4,016,375
[45] Apr. 5, 1977

[54] ELECTRET TRANSDUCER

[75] Inventor: Jan Van Turnhout, Delft, Netherlands

[73] Assignee: U.S. Philips Corporation, New York, N.Y.

[22] Filed: Mar. 11, 1975

[21] Appl. No.: 557,274

[44] Published under the second Trial Voluntary Protest Program on March 23, 1976 as document No. B 557,274.

[30] Foreign Application Priority Data

Mar. 15, 1974 Netherlands .................... 7403471

[52] U.S. Cl. ...................... 179/111 E; 307/88 ET
[51] Int. Cl.² .................... H04R 19/00; H01G 7/02
[58] Field of Search ............. 179/111 E; 307/88 ET Primary Examiner—Kathleen H. Claffy
Assistant Examiner—George G. Stellar
Attorney, Agent, or Firm—Frank R. Trifari; Bernard Franzblau

[57] ABSTRACT

An electrostatic transducer, provided with at least two electrodes arranged opposite each other, of which one electrode forms part of a diaphragm and of which the other electrode is fixed, a disc of an electret material being disposed between the electrodes and at one of the electrodes, which electret material consists of a polymer of tetrafluoroethylene and perfluorine (alkylvinylether), in which the alkylgroup contains from 1 to 5 carbon atoms.

This yields the advantage that when employed as a diaphragm said foil is extremely suited for use in loudspeakers and larger microphones.

4 Claims, 2 Drawing Figures

ELECTRET TRANSDUCER

The invention relates to an electrostatic transducer provided with at least two electrodes which are disposed opposite each other, of which one electrode forms part of a diaphragm and of which the other electrode is fixed, an electret material being disposed between the electrodes and at one of the electrodes.

Such a transducer is known from Austrian Pat. Specification No. 305,399. In said Specification a microphone is described which operates in accordance with the condenser principle. The diaphragm consists of an electret foil which is stretched over a rear electrode. The foil material comprises a co-polymer of tetrafluoroethylene and hexafluoropropylene which is known by the trade name Teflon FEP and whose electret properties are excellent. However, a drawback of said material is that it is mechanically very weak. As a result, the use of said material is limited to microphones of small dimensions and it is not suited for use in microphones of greater dimensions, or in electrostatic loudspeakers and headphones.

In U.S. Pat. application Ser. No. 380,750 filed July 19, 1973 now abandoned, the Applicant has proposed an electret foil which substantially mitigates said drawbacks. Said foil is composed of two layers, of which one layer consists of an electret material, for example Teflon FEP, and the other layer is made of a non-electret material, for example Kapton, said last-mentioned layer serving as a base carrier.

The use of said "sandwich" foil as a diaphragm in a microphone has the drawback that the mass of the diaphragm is substantially increased by the carrier layer, which results in less satisfactory acoustic properties of the microphone.

Figure 1:
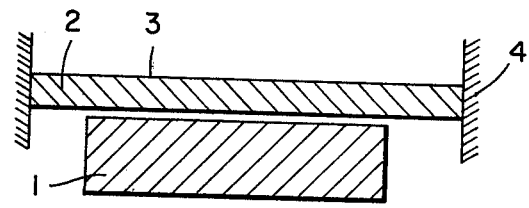

FIGS. 1 and 2 show first and second embodiments of electret transducers according to the invention.

The invention is characterized in that the electret material consists of a co-polymer of tetrafluoroethylene and perfluorine (alkyl vinylether), in which the alkylgroup contains from 1 to 5 carbon atoms.

Said material exhibits substantially the same electret properties as the co-polymer of tetrafluoroethylene and hexafluoropropylene (Teflon FEP), but is mechanically substantially stronger, and hence eminently suited for use in the form of an electret foil in loudspeakers and headphones having diaphragm diameters which are greater than 1 inch.

Satisfactory results have been obtained with the use of a foil of a co-polymer of tetrafluoroethylene and perfluorine (alkyl-vinylether) in which the alkylgroup contained from 2 to 4 carbon atoms and the ether monomer was 1.5 to 5 percent by weight of the co-polymer, which is marketed by Messrs. Dupont de Nemours under the trade name Teflon PFA. Said material exhibits the following properties (the values for the material Teflon FEP are specified in parentheses):

| | | |
|---|---|---|
| melting point | : 300 – 310°C | (260–280) |
| tensile strength at 23°C | : 300 kg/cm$^2$ | (200) |
| elastic strength at 23°C | : 155 kg/cm$^2$ | (199) |
| modulus of elasticity | : 7000 kg/cm$^2$ | (4900) |
| nominal MIT flex endurance 0.18 – 0.2 mm at 1000 Hz | : 300 – 500.10$^3$ | (4000) |

The foil may be employed as a diaphragm, viz. in the manner as described in the previously cited Austrian Pat. No. 305,399. This is shown in FIG. 1 wherein a fixed electrode 1 is arranged adjacent to a diaphragm consisting of an electret foil 2 on which a metal layer has been deposited to form an electrode 3. The diaphragm is suspended from a frame illustrated schematically by reference numeral 4.

Another possibility, as shown in FIG. 2, is to superimpose two electret foils 5 and 6 with a thin metal-layer 7 as a separating layer. The foils are polarized transversely and oppositely. The diaphragm is disposed between two fixed electrodes 8 and 9.

Such an embodiment is particularly suited for use in loudspeakers and headphone capsules.

In the last-mentioned case the thickness of the diaphragm is 2 × 12.5 μm for a diameter of 55 mm.

It is particularly favourable to apply the electrode of the diaphragm in the form of a vacuum-deposited gold or nickel-chromium layer. When using nickel-chromium on PFA-foil it has been found that this is better capable of withstanding oxidation at 70°C.

Furthermore, it is possible to dispose the electret material as a disc or foil against the fixed electrode, the diaphragm consisting of a metal vibrating membrane. In this respect it is to be noted that it has been found that the PFA material can be fixed much better to the fixed electrode than the FEP-material.

Further, experiments have revealed that when PFA-foil is used, a transducer according to the invention is particularly suited for use as a push-button.

What is claimed is:

1. An electrostatic transducer comprising, at least two electrodes, which are disposed opposite each other, of which one electrode forms part of a vibratory diaphragm and of which the other electrode is fixed, a disc of electret material being disposed between the electrodes and at one of the electrodes, characterized in that the electret material comprises a co-polymer of tetrafluoroethylene and perfluorine (alkylvinylether), in which the alkylgroup contains from 1 to 5 carbon atoms.

2. A transducer as claimed in claim 1, characterized in that the electret material takes the form of a foil.

3. A transducer as claimed in claim 2, characterized in that the foil functions as a diaphragm, said one electrode comprising a vacuum-deposited metal layer.

4. A transducer, as claimed in claim 1, characterized in that two foils of an electret material which are oppositely polarised in a transverse direction, separated by a metal layer which serves as an electrode comprises a diaphragm of a loudspeaker, the diaphragm being disposed between two fixed electrodes.

* * * * *